US 6,555,808 B2

(12) United States Patent
Takeuchi et al.

(10) Patent No.: US 6,555,808 B2
(45) Date of Patent: Apr. 29, 2003

(54) APPARATUS FOR DETECTING ROTATIONAL ANGLE

(75) Inventors: Shuichi Takeuchi, Aichi (JP); Kouichi Ohno, Aichi (JP)

(73) Assignee: Kabushiki Kaisha Tokai Rika Denki Seisakusho, Aichi (JP)

( * ) Notice: Subject to any disclaimer, the term of this patent is extended or adjusted under 35 U.S.C. 154(b) by 84 days.

(21) Appl. No.: 09/906,242

(22) Filed: Jul. 16, 2001

(65) Prior Publication Data

US 2002/0005476 A1 Jan. 17, 2002

(30) Foreign Application Priority Data

Jul. 17, 2000 (JP) ......................................... 2000-215629

(51) Int. Cl.[7] ................................................. G01D 5/34
(52) U.S. Cl. ............................... 250/231.13; 250/231.16
(58) Field of Search ............................ 250/231.13, 229, 250/216, 231.16, 231.18; 356/71; 341/1, 13, 31; 340/438, 463, 465, 671

(56) References Cited

U.S. PATENT DOCUMENTS

| 4,263,506 A | 4/1981 | Epstein ................. 250/231 SE |
| 4,414,754 A | 11/1983 | Lapeyre ..................... 33/363 K |
| 4,530,155 A | 7/1985 | Burkhardt et al. ............. 33/1 L |
| 5,091,643 A | * 2/1992 | Okutani et al. ........ 250/231.14 |
| 6,093,928 A | 7/2000 | Ohtomo et al. ........ 250/231.13 |
| 6,158,132 A | 12/2000 | Kofink et al. ................ 33/1 PT |
| 6,170,162 B1 | 1/2001 | Jacobsen et al. ............ 33/1 PT |
| 6,298,565 B1 | 10/2001 | Weber et al. ................ 33/1 PT |
| 6,311,401 B1 | 11/2001 | Neckel et al. ............... 33/1 PT |

FOREIGN PATENT DOCUMENTS

| EP | 0184286 | 6/1986 | .......... G01D/5/249 |
| EP | 0911611 | 4/1999 | .......... G01D/5/249 |
| GB | 2189663 | 10/1987 | ............ H03M/1/28 |

* cited by examiner

Primary Examiner—David Porta
Assistant Examiner—Patrick J. Lee
(74) Attorney, Agent, or Firm—Synnestvedt & Lechner LLP

(57) ABSTRACT

A relative rotational angle of a rotary body is measured with respect to a reference angle. First openings are arranged about the circumference of a disk, which rotates integrally with the rotary body, at predetermined pitches. A first detecting element detects the first openings and generates a first binary code. The relative rotational angle of the rotary body is computed in accordance with the first binary code. A second detecting element detects the second openings and generates a second binary code. The reference angle of the rotary body is computed and reset in accordance with the second binary code. Third openings are concentrical with the first and second openings. A third detecting element detects the third openings and generates a third binary code. The reference angle is determined based on the combination of the first and third binary codes.

18 Claims, 8 Drawing Sheets

Fig.5

| No. | Rotational Angle Data (°) | Rotary Disk Pattern Reference Angle | Position | Relative Angle | Bit Code 5th | 3rd | 4th | 1st | 2nd | Output (Decimal) (5th × Decimal of the Four-bit Code of 1st to 4th) |
|---|---|---|---|---|---|---|---|---|---|---|
| 0 | 0 | 1 | 0 | 0 | 1 | 0 | 0 | 0 | 1 | 1 |
| 1 | 1 | 1 | 0 | 0 | 0 | 0 | 0 | 0 | 0 | 0 |
| 2 | 2 | 0 | 0 | 1 | 0 | 0 | 0 | 1 | 0 | 0 |
| 3 | 3 | 0 | 0 | 1 | 0 | 0 | 0 | 1 | 1 | 0 |
| 4 | 4 | 0 | 0 | 0 | 0 | 0 | 0 | 0 | 1 | 0 |
| ⋮ | ⋮ | | | ⋮ | | | ⋮ | | | ⋮ |
| 7 | 7 | 0 | 0 | 1 | 0 | 0 | 0 | 1 | 1 | 0 |
| ⋮ | ⋮ | | | ⋮ | | | ⋮ | | | ⋮ |
| 22 | 22 | 1 | 0 | 1 | 1 | 0 | 1 | 1 | 0 | 6 |
| ⋮ | ⋮ | ⋮ | ⋮ | ⋮ | | | ⋮ | | | ⋮ |
| 29 | 29 | 0 | 1 | 0 | 0 | 1 | 0 | 0 | 0 | 0 |
| ⋮ | ⋮ | | | ⋮ | | | ⋮ | | | ⋮ |
| 45 | 45 | 1 | 1 | 0 | 1 | 1 | 0 | 0 | 0 | 8 |
| ⋮ | ⋮ 20 | | ⋮ | 18 16 | | | ⋮ | | | ⋮ |
| 67 | 67 | 1 | 1 | 1 | 1 | 1 | 1 | 1 | 1 | 15 |
| ⋮ | ⋮ 19 | | | 17 | | | ⋮ | | | ⋮ |
| 74 | 74 | 0 | 1 | 1 | 0 | 1 | 0 | 1 | 0 | 0 |
| ⋮ | ⋮ | | | ⋮ | | | ⋮ | | | ⋮ |
| 90 | 90 | 1 | 0 | 1 | 1 | 0 | 0 | 1 | 0 | 2 |
| ⋮ | ⋮ | | | ⋮ | | | ⋮ | | | ⋮ |
| 112 | 112 | 1 | 0 | 0 | 1 | 0 | 1 | 0 | 1 | 5 |
| ⋮ | ⋮ | | | ⋮ | | | ⋮ | | | ⋮ |
| 135 | 135 | 1 | 1 | 1 | 1 | 1 | 0 | 1 | 1 | 11 |
| ⋮ | ⋮ | | | ⋮ | | | ⋮ | | | ⋮ |
| 157 | 157 | 1 | 1 | 0 | 1 | 1 | 1 | 0 | 0 | 12 |
| ⋮ | ⋮ | | | ⋮ | | | ⋮ | | | ⋮ |
| 180 | 180 | 1 | 1 | 0 | 1 | 1 | 1 | 0 | 1 | 13 |
| ⋮ | ⋮ | | | ⋮ | | | ⋮ | | | ⋮ |
| 202 | 202 | 1 | 1 | 1 | 1 | 1 | 0 | 1 | 0 | 10 |
| ⋮ | ⋮ | | | ⋮ | | | ⋮ | | | ⋮ |
| 225 | 225 | 1 | 0 | 0 | 1 | 0 | 1 | 0 | 0 | 4 |
| ⋮ | ⋮ | | | ⋮ | | | ⋮ | | | ⋮ |
| 247 | 247 | 1 | 0 | 1 | 1 | 0 | 0 | 1 | 1 | 3 |
| ⋮ | ⋮ | | | ⋮ | | | ⋮ | | | ⋮ |

APPARATUS FOR DETECTING ROTATIONAL ANGLE

BACKGROUND OF THE INVENTION

The present invention relates to apparatuses for detecting a rotational angle, and, more particularly to apparatuses detecting the rotational angle of a steering wheel of a vehicle.

FIG. 6 shows a prior art rotational angle detecting apparatus 51. The rotational angle detecting apparatus 51 includes a first detecting piece 54 and a second detecting piece 55, which oppose each other. A rotary disk 53 is located between the first and second detecting pieces 54, 55 and is secured to a steering shaft 52. An opening group 56 is located at an outer circumferential portion of the rotary disk 53. The opening group 56 is used for detecting a relative angle of the steering shaft 52, or the angle by which the rotary disk 53 is rotated relative to a reference position. The opening group 56 is located along a circle the center of which corresponds to point O. The opening group 56 includes a plurality of openings 56a that extend through the rotary disk 53 and are separated from adjacent openings 56a at equal intervals. As shown in FIG. 8, the circumferential dimension W1 of each opening 56a is equal to the interval W2 between adjacent openings 56a. As shown in FIGS. 6 and 7, an opening 57 extends through the rotary disk 53 and is located radially inward from the opening group 56. That is, the opening 57 is located on a circle that is coaxial with the circle along which the openings 56a are located. The opening 57 is used or determining the reference position of the rotary disk 53. The first detecting piece 54 includes a first light emitting element 58a and a second light emitting element 59a. The first and second light emitting elements 58a, 59a are located at positions corresponding to a path defined by the opening group 56 when the rotary disk 53 rotates. The first piece 54 includes a third light emitting element 60a located at a position corresponding to a path defined by the opening 57 when the rotary disk 53 rotates. The second detecting piece 55 includes a first light receiving element 58b and a second light receiving element 59b, which oppose the first light emitting element 58a and the second light emitting element 59a, respectively. The second detecting piece 55 includes a third light receiving element 60b that opposes the third light emitting element 60a.

The first light emitting element 58a and the first light receiving element 58b form a first detector 58. In the same manner, the second light emitting element 59a and the second light receiving element 59b form a second detector 59. The first and second detectors 58, 59 form a rotational angle sensor 61 that detects the angle by which the steering shaft 52, or the rotary disk 53, is rotated. Further, the third light emitting element 60a and the third light receiving element 60b form a reference position sensor 60. The reference position sensor 60 detects that the rotary disk 53 is located at the reference position.

The first detector 58 of the angle sensor 61 generates a binary code depending on whether or not the rotary disk 53 blocks the first light emitting element 58a from the first light receiving element 58b. Likewise, the second detector 59 of the angle sensor 61 generates a binary code depending on whether or not the rotary disk 53 blocks the second light emitting element 59a from the second light receiving element 59b. Thus, the rotational angle sensor 61 generates a two-bit code depending on whether or not each detector 58, 59 faces any opening 56a of the opening group 56.

The first and second detectors 58, 59 are located relative to each other such that the phase of the binary code emitted by the second detector 59 is offset from the phase of the binary code emitted by the first detector 58 by a quarter cycle. More specifically, if the first and second detectors 58, 59 both face corresponding openings 56a, as shown in FIG. 8(a), the rotational angle sensor 61 generates a two-bit code "1·1". If the rotary disk 53 rotates from this state in a direction indicated by the arrow of FIG. 8(a) to block the first light emitting element 58a from the first light receiving element 58b, as shown in FIG. 8(b), the rotational angle sensor 61 generates a two-bit code "0·1". If the rotary disk 53 further rotates in the same direction to block both the first and second light emitting elements 58a, 59a from the associated light receiving elements 58b, 59b, as shown in FIG. 8(c), the rotational angle sensor 61 generates a two-bit code "0·0". If the rotary disk 53 further rotates in the same direction to block the second light emitting element 59a from the second light receiving element 59b, as shown in FIG. 8(d), the rotational angle sensor 61 generates a two-bit code "1·0".

If the rotary disk 53 further rotates in the same direction, the first and second detectors 58, 59 both face corresponding openings 56a, thus restoring the state of FIG. 8(a). In other words, when the rotary disk 53 rotates in the direction indicated by the arrows of FIGS. 8(a) to 8(d), the rotational angle sensor 61 successively generates two-bit codes "1·1", "0·1", "0·0", and "1·0" in this order in a repeated manner. If the rotary disk 53 rotates in an opposite direction, the angle sensor 61 successively generates the two-bit codes in the opposite order.

Accordingly, the rotational direction of the rotary disk 53 is determined in accordance with the order in which the angle sensor 61 generates the two-bit codes. Further, the rotational angle of the rotary disk 53 is also detected in accordance with the angle of motion required to change the two-bit code. That is, if the rotational angle sensor 61 is configured to generate a two-bit code each time the rotational angle of the rotary disk 53 varies by one degree, the resolution of the rotational angle detecting apparatus 51 is one degree.

The reference position sensor 60 generates a binary code depending on whether or not the rotary disk 53 blocks the third light emitting element 60a from the third light receiving element 60b. More specifically, if the opening 57 is located between the third light emitting element 60a and the third light receiving element 60b, the reference position sensor 60 generates a binary code "1". Otherwise, the reference position sensor 60 generates a binary code "0".

In the rotational angle detecting apparatus 51, which is constructed as described above, operation is initiated by the reference position sensor 60. More specifically, if the reference position sensor 60 detects that the opening 57 is located between the third light emitting element 60a and the third light receiving element 60b, the corresponding angle at which the rotary disk 53 is rotated is defined as the reference angle (which is, for example, zero degrees). A memory of the rotational angle detecting apparatus 51 is thus initialized. Subsequently, the rotational angle sensor 61 generates a two-bit code depending on whether or not each detector 58, 59 faces any opening 56a. The rotational angle detecting apparatus 51 thus computes the rotational angle of the rotary disk 53 with respect to the reference angle in accordance with the two-bit code generated by the rotational angle sensor 61.

However, in the rotational angle detecting apparatus 51, the reference angle of the rotary disk 53 is determined only in accordance with the position of the opening 57. Thus, the memory of the rotational angle detecting apparatus 51 may not be initialized unless the rotary disk 53 is rotated at substantially 360 degrees. This complicates the initialization.

BRIEF SUMMARY OF THE INVENTION

Accordingly, it is an objective of the present invention to provide a rotational angle detecting apparatus that easily initializes a memory regarding a rotational angle of a rotary disk.

To achieve the foregoing and other objectives and in accordance with the purpose of the present invention, the invention provides a rotational angle detecting apparatus in which, a relative rotational angle of a rotary body is measured with respect to a reference angle. The apparatus includes a disk, a first opening group, a first detecting element, a computing means, a second opening group, a second detecting element, a third opening group, a third detecting element, a memory, and a determining means. The disk is coaxial with the rotary body and rotates integrally with the rotary body. The first group of openings includes a plurality of openings arranged about the entire circumference of the disk and spaced from one another by a predetermined pitch. The openings of the first group are used for detecting the relative rotational angle. The first detecting element detects openings of the first group and generates a first binary code. The computing means computes the relative angle of the rotary body in accordance with the first binary code. The second group of openings includes a plurality of openings arranged concentrically with the first group. The openings of the second group are used for detecting a plurality of reference angles that are located at predetermined positions.

The second detecting element detects openings of the second group and generates a second binary code. The third group of opening includes a plurality of openings arranged concentrically with the first and second groups. The openings of the third group are located relative to one another in accordance with a predetermined arrangement. The third detecting element detects openings of the third group and generates a third binary code. The memory stores a combination of the first binary code and the third binary code in correspondence with angle data. The combination varies depending on the position of the rotary body. The determining means determines the reference angle in accordance with the associated combination of the first and third binary codes that are stored by the memory.

Other aspects and advantages of the invention will become apparent from the following description, taken in conjunction with the accompanying drawings, illustrating by way of example the principles of the invention.

BRIEF DESCRIPTION OF THE DRAWINGS

The invention, together with objects and advantages thereof, may best be understood by reference to the following description of the presently preferred embodiments together with the accompanying drawings in which:

FIG. 5 is a bit map table indicating binary codes that are generated by detecting means of the rotational angle detecting apparatus of FIG. 1;

DETAILED DESCRIPTION OF THE PREFERRED EMBODIMENTS

A rotational angle detecting apparatus 1 of an embodiment according to the present invention will be now described with reference to FIGS. 1 to 5. The rotational angle detecting apparatus 1 detects the rotational angle of a vehicle steering wheel.

Figure 1:
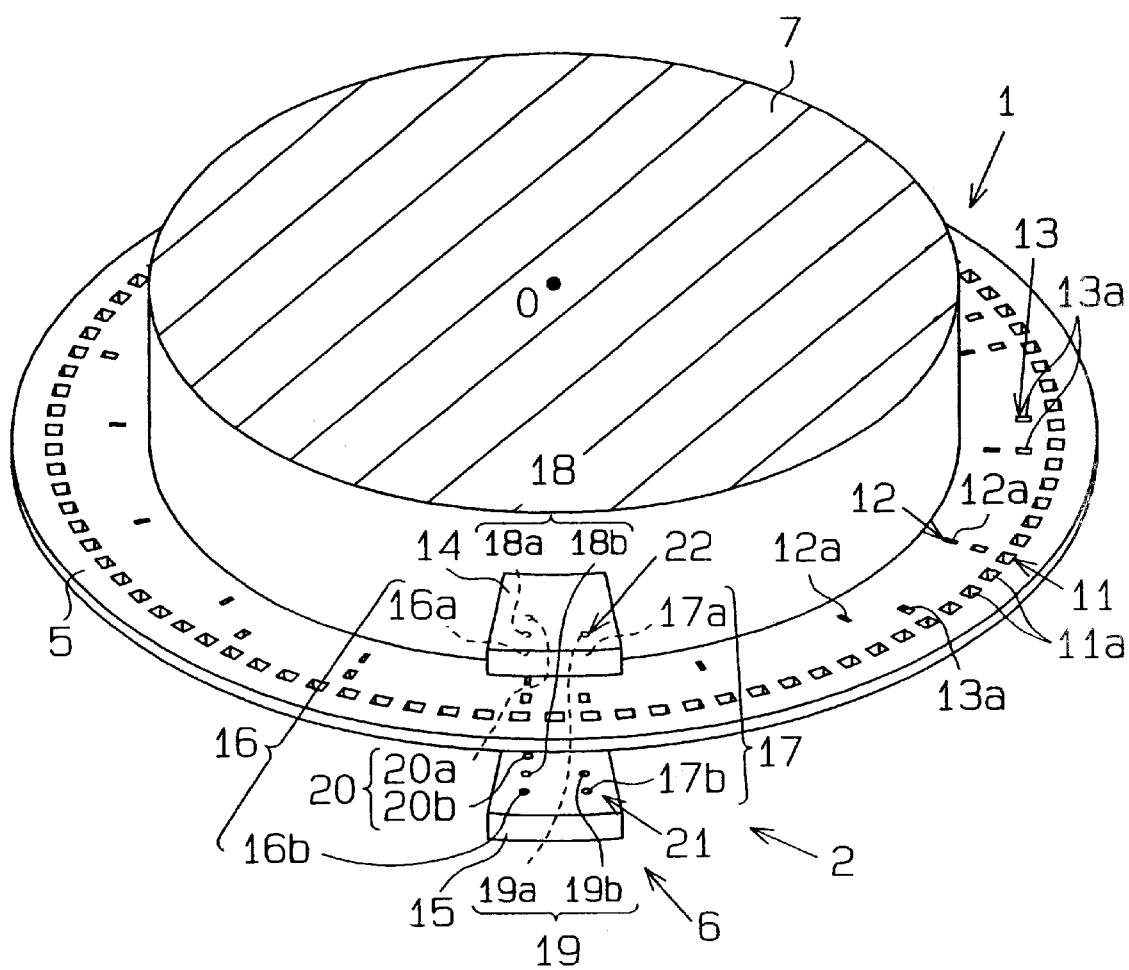
FIG. 1 is a perspective view showing a rotational angle detecting apparatus according to the present invention.
Figure 4:
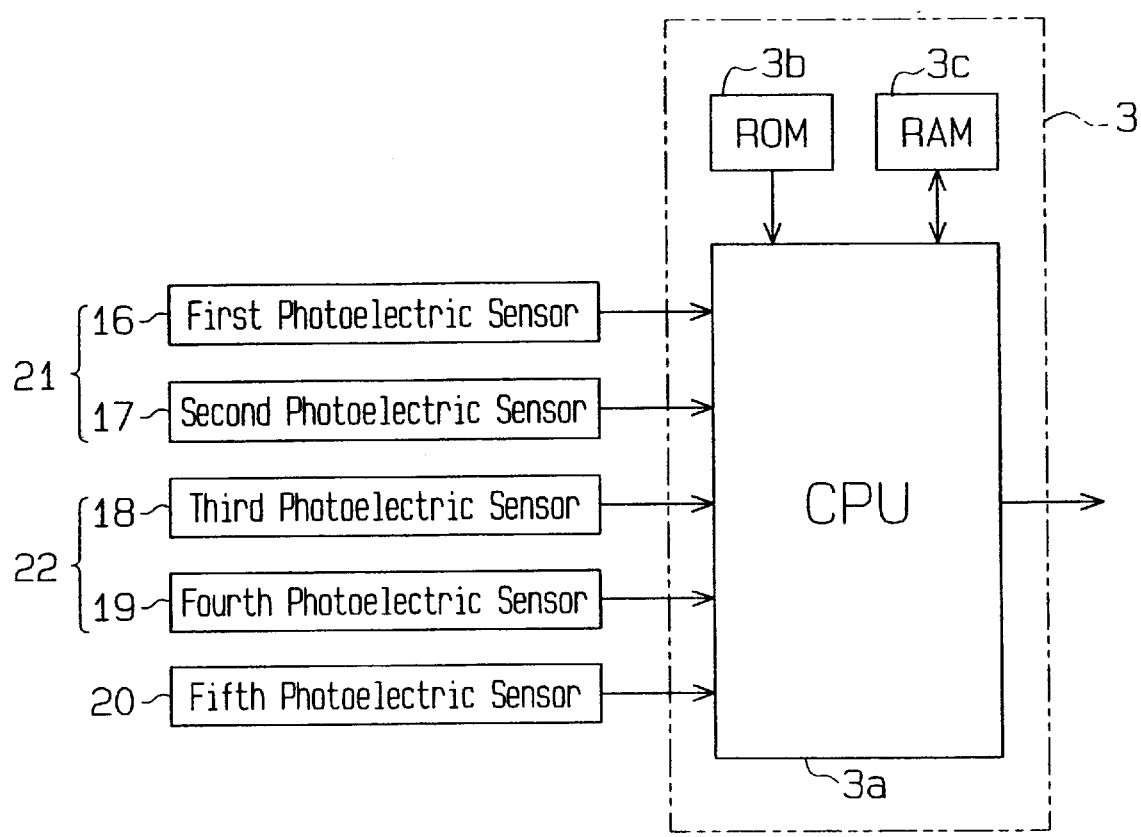
FIG. 4 is a block diagram showing the electric configuration of the rotational angle detecting apparatus of FIG. 1.
Figure 6:
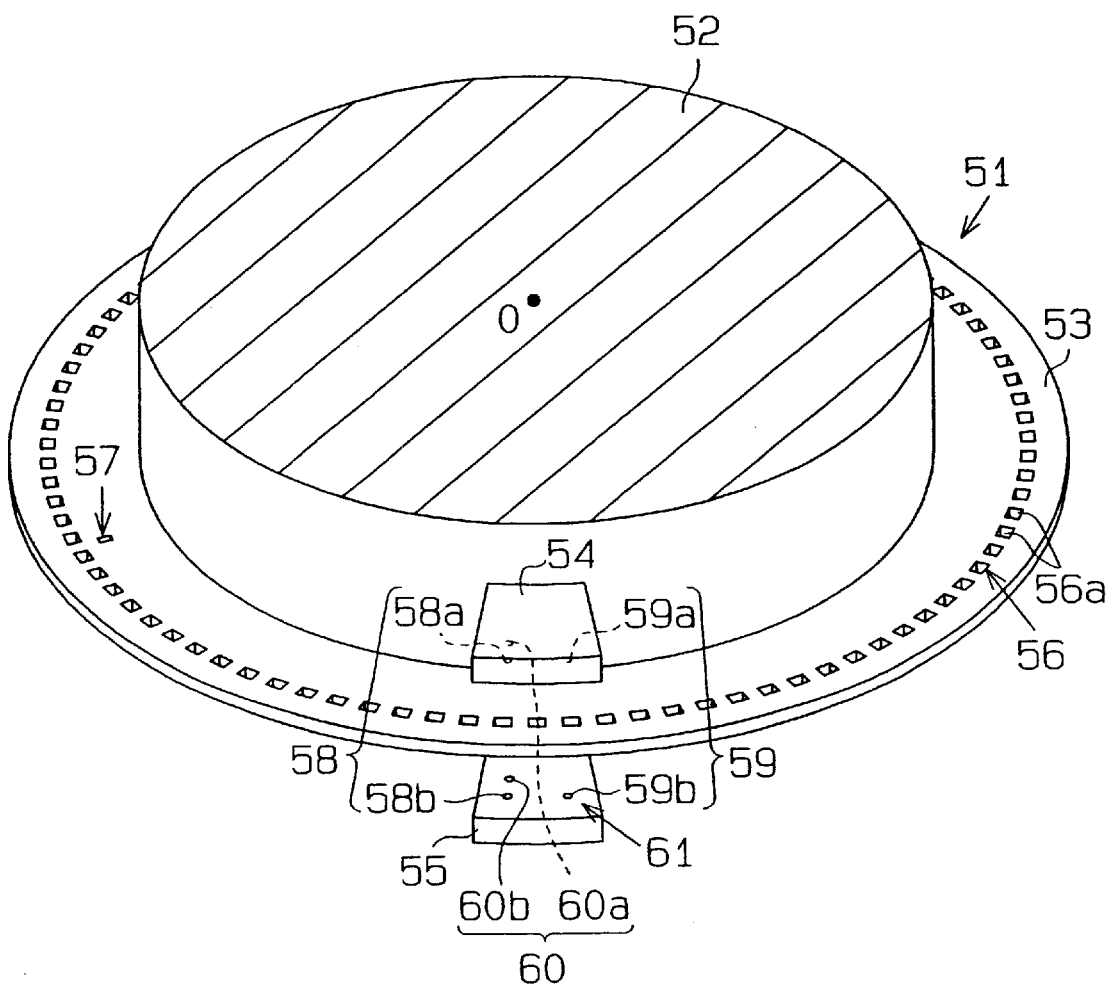
FIG. 6 is a perspective view showing a prior art rotational angle rotating apparatus.
Figure 7:
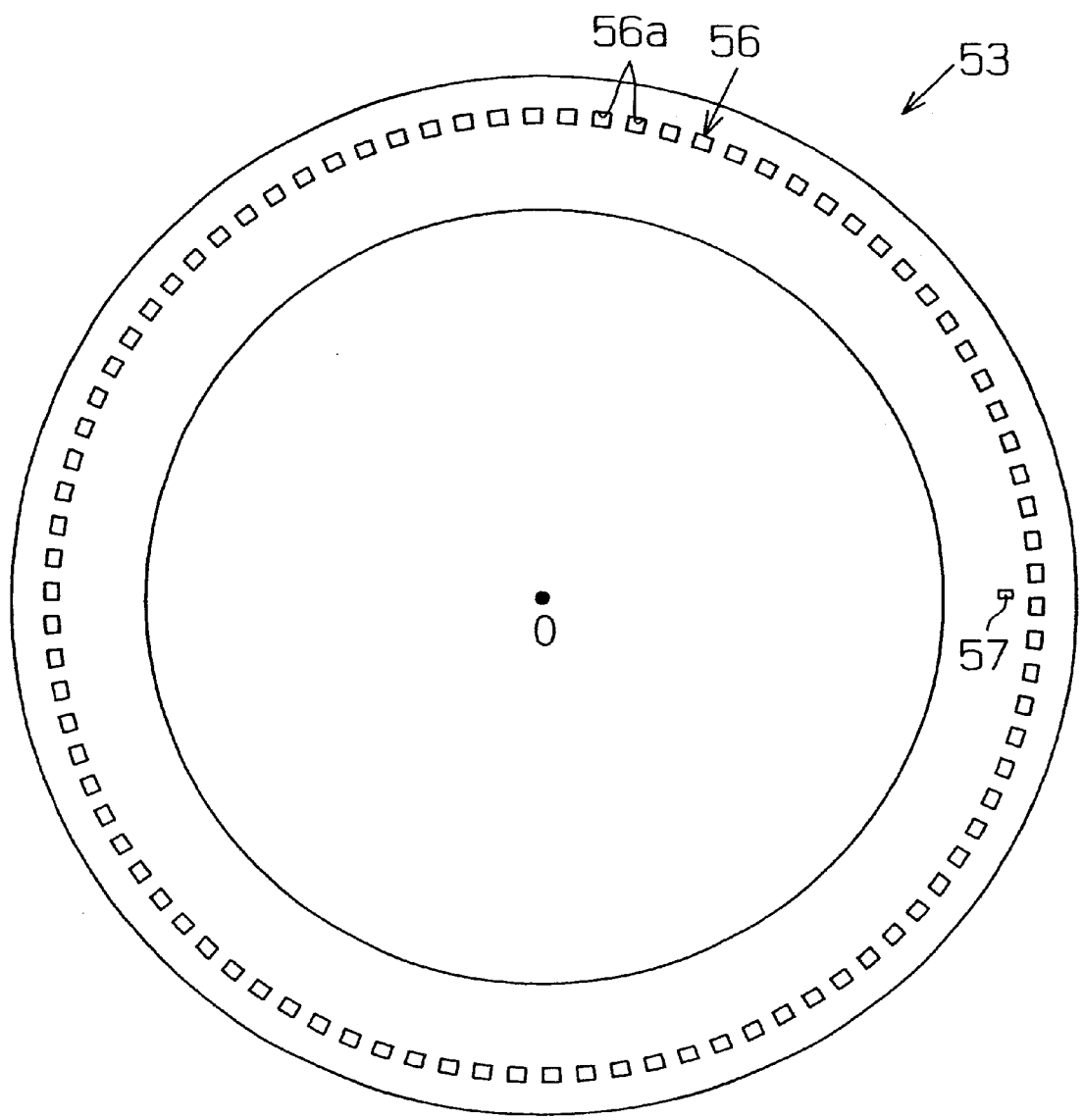
FIG. 7 is a plan view showing a rotary disk of the rotational angle detecting apparatus of FIG. 6.
Figure 8A:
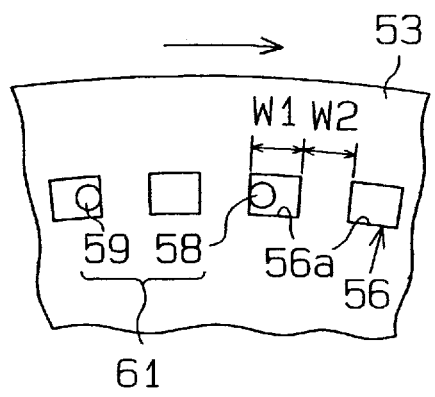
FIG. 8(a) is a plan view showing a portion of the rotary disk of FIG. 7 in a rotational angle detecting state.
Figure 8B:
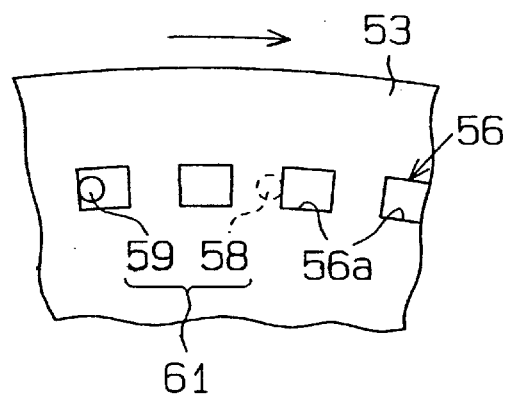
FIG. 8(b) is a plan view showing a portion of the rotary disk of FIG. 7 in another rotational angle detecting state when the rotary disk is rotated in the direction indicated by the arrow from the state of FIG. 8(a)
Figure 8C:
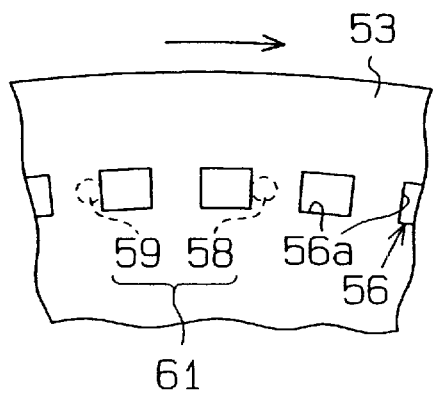
FIG. 8(c) is a plan view showing a portion of the rotary disk of FIG. 7 in another rotational angle detecting state when the rotary disk is rotated in the direction indicated by the arrow from the state of FIG. 8(b)
Figure 8D:
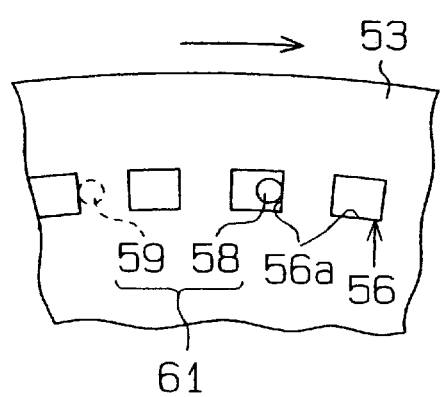
FIG. 8(d) is a plan view showing a portion of the rotary disk of FIG. 7 in another rotational angle detecting state when the rotary disk is rotated in the direction indicated by the arrow from the state of FIG. 8(c).

The rotational angle detecting apparatus 1 includes a detector 2, as shown in FIG. 1, and a computing portion 3, as shown in FIG. 4. The detector 2 detects the rotational angle of the steering wheel and generates a detection signal. The computing portion 3 computes the rotational angle of the steering wheel in accordance with the detection signal from the detector 2.

As shown in FIG. 1, the detector 2 includes a rotary disk 5 and a detecting member 6. The rotary disk 5 is formed of non-transparent synthetic resin. The rotary disk 5 is secured to a steering shaft 7. The rotary disk 5 thus rotates around the axis O integrally with the steering shaft 7.

Figure 2:
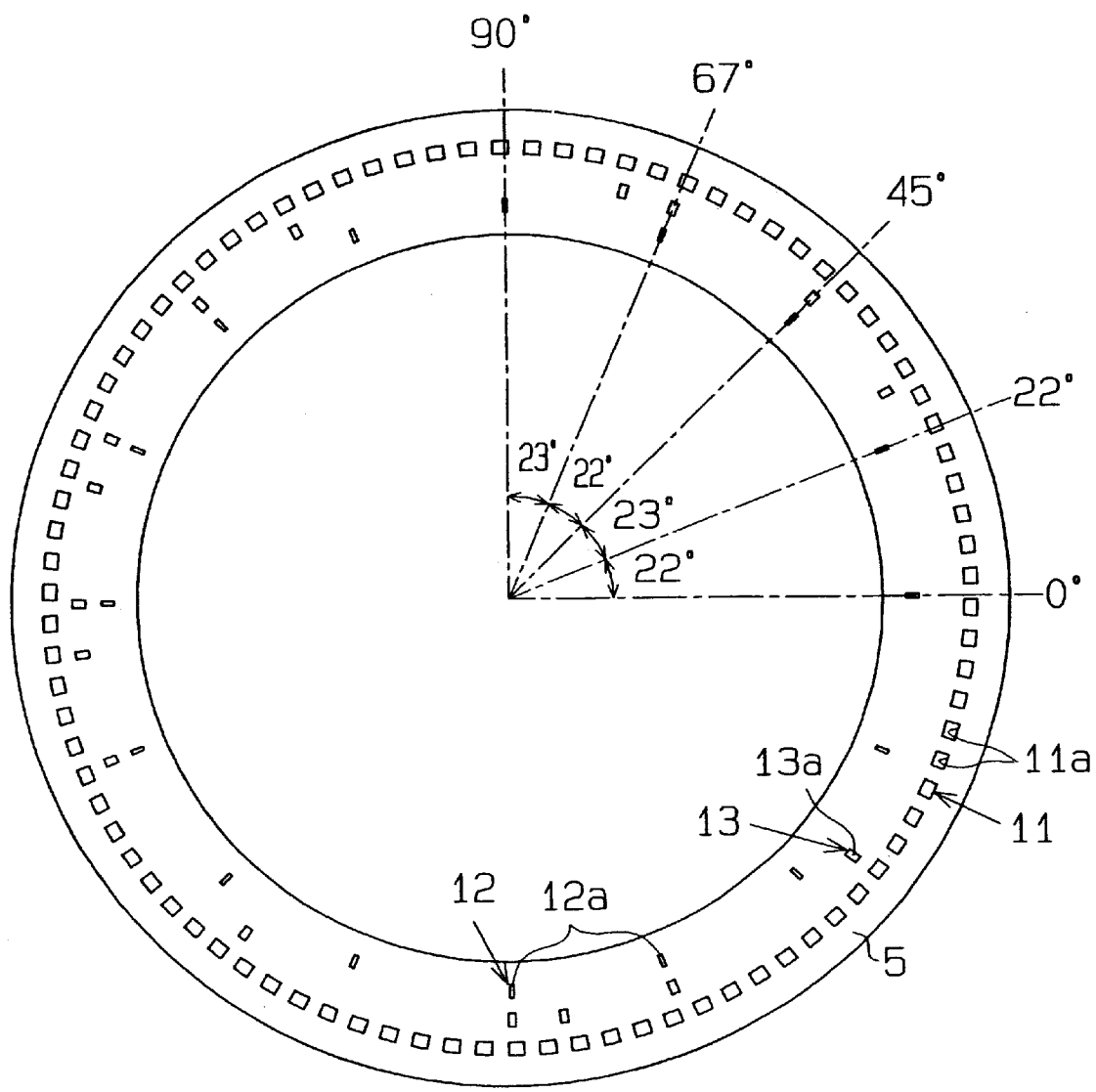
FIG. 2 is a plan view showing a rotary disk of the rotational angle detecting apparatus of FIG. 1.

As shown in FIGS. 1 and 2, the rotary disk 5 includes a first opening group 11 that is located along a circle with a predetermined radius with respect to the axis O. The first opening group 11 includes a plurality of (in this embodiment, ninety) openings 11a that extend through the rotary disk 5.

Figure 3:
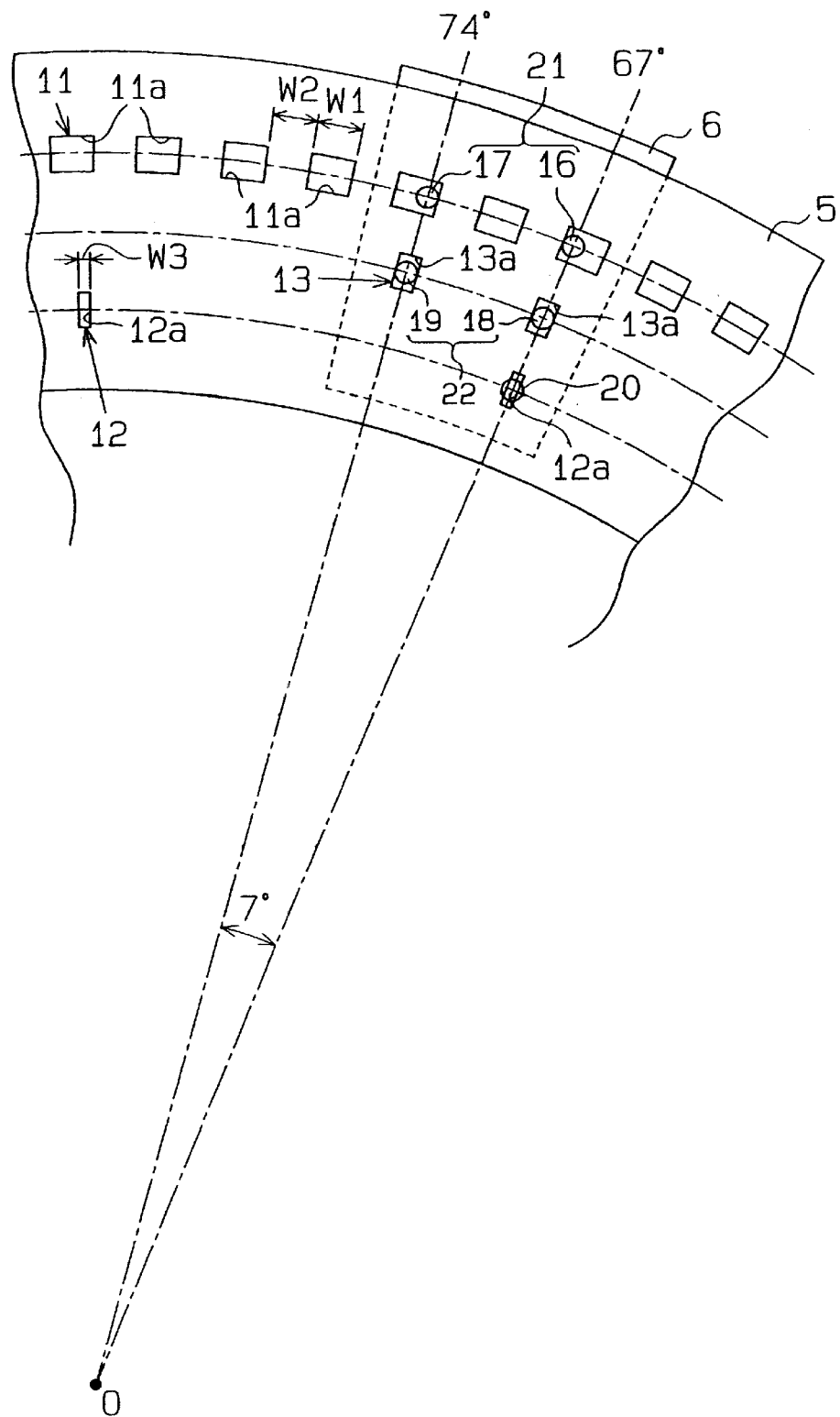
FIG. 3 is an enlarged plan view showing a portion of the rotary disk of FIG. 2.

The openings 11a are spaced from one another at equal intervals. As shown in FIG. 3, each opening 11a has a substantially square shape. The circumferential dimension W1 of each opening 11a is equal to the circumferential interval W2 between adjacent openings 11a.

The rotary disk 5 also includes a second opening group 12. The second opening group 12 is located radially inward from the first opening group 11 along a circle that is coaxial with the circle along which the first group 11 is arranged. The second opening group 12 includes a plurality of openings 12a that extend through the rotary disk 5. Each opening 12a is spaced from the adjacent opening 12a by a predetermined angle. More specifically, the second opening group 12 has sixteen openings 12a. Each opening 12a is spaced from one adjacent opening 12a by an angle of 23 degrees and from the other adjacent opening 12a by an angle of 22 degrees. In other words, the openings 12a are located on the rotary disk 5 at positions corresponding to zero degrees, 22 degrees, 45 degrees, 67 degrees, 90 degrees, . . . 292 degrees, 315 degrees, and 337 degrees, where the dots represent omitted angles that follow this pattern. Further, as shown in FIG. 3, the circumferential dimension W3 of each opening 12a is approximately one third of the circumferential distance W1 between the adjacent openings 11a of the first opening group 11.

The rotary disk 5 further includes a third opening group 13. The third opening group 13 is located between the first opening group 11 and the second opening group 12. The opening group 13 is located on a circle that is coaxial with the circle of the first opening group 11 and the circle of the second group 12. The third opening group 13 includes a plurality of openings 13a that extend through the rotary disk 5. Each opening 13a is spaced from an adjacent opening 13a by a predetermined interval. More specifically, each opening 13a is located relative to the corresponding openings 11a, 12a such that a binary code corresponding to an opening 13a does not interfere with a binary code corresponding to any opening 11a, 12a, when a reference angle is detected, as will be later described.

As shown in FIG. 1, the detecting member 6 includes a first detecting piece 14 and a second detecting piece 15, which oppose each other. The rotary disk 5 is located between the first and second detecting pieces 14, 15. The first and second detecting pieces 14, 15 are secured to a support member (not shown) located around the steering shaft 7. This structure prevents the first and second detecting pieces 14, 15 from rotating integrally with the steering shaft 7.

Accordingly, if the rotary disk 5 rotates integrally with the steering shaft 7, the periphery of the rotary disk 5 passes between the first and second detecting pieces 14, 15.

The detecting member 6 includes first to fifth photoelectric sensors 16 to 20. More specifically, the first detecting piece 14 includes first to fifth light emitting elements 16a, 17a, 18a, 19a, 20a, and the second detecting piece 15 includes first to fifth light receiving elements 16b, 17b, 18b, 19b, 20b. That is, the first to fifth light emitting elements 16a to 20a correspond to the first to fifth photoelectric sensors 16 to 20, respectively. In the same manner, the first to fifth light receiving elements 16b to 20b correspond to the first to fifth photoelectric sensors 16 to 20, respectively.

As shown in FIGS. 1 and 3, the first and second photoelectric sensors 16, 17 are located at positions corresponding to a path formed by the first opening group 11 when the rotary disk 5 rotates. The first and second photoelectric sensors 16, 17 form a relative angle detecting element 21 that detects the angle by which the steering shaft 7 is rotated relative to a reference angle. The first photoelectric sensor 16 generates a binary code depending on whether-or not the rotary disk 5 blocks the first light emitting element 16a from the first light receiving element 16b. In the same manner, the second photoelectric sensor 17 generates a binary code depending on whether or not the rotary disk 5 blocks the second light emitting element 17a from the second light receiving element 17b. That is, the relative angle detecting element 21 generates a two-bit code depending on whether or not each photoelectric sensor 16, 17 faces an opening 11a. The first and second photoelectric sensors 16, 17 are located relative to each other such that the phase of a binary code generated by the second photoelectric sensor 17 is offset from the phase of a binary code generated by the first photoelectric sensor 16 by one quarter cycle. Accordingly, like the prior art rotational angle detecting apparatus 51, the relative angle detecting element 21 successively generates two-bit codes, or "1·1", "0·1", "0·0", and "1·0" in this order in a repeated manner, when the rotary disk 5 rotates in the direction indicated by arrow F of FIG. 1. In other words, every time a two-bit code is replaced by a subsequent signal, only a single digit of the signal is changed. That is, the two-bit codes are generated in accordance with a so-called alternating binary code system.

Further, as shown in FIG. 3, the first photoelectric sensor 16 is spaced from the second photoelectric sensor 17 by seven degrees. In addition, the first opening group 11 of this embodiment includes ninety openings 11a. Thus, the relative angle detecting element 21 generates a two-bit code every time the rotational angle of the rotary disk 5 is varied by one degree.

The third and fourth photoelectric sensors 18, 19 are located at positions corresponding to a path formed by the third opening group 13 when the rotary disk 5 rotates. The third and fourth photoelectric sensors 18, 19 form a position data detecting element 22. As shown in FIG. 3, the third photoelectric sensor 18 is located on the radius of the axis O and the first photoelectric sensor 16. The fourth photoelectric sensor 19 is located on the radius of the second photoelectric sensor 17. The third photoelectric sensor 18 generates a binary code depending on whether or not the rotary disk 5 blocks the third light emitting element 18a from the third light receiving element 18b. In the same manner, the fourth photoelectric sensor 19 generates a binary code depending on whether or not the rotary disk 5 blocks the fourth light emitting element 19a from the fourth light receiving element 19b. That is, the position data detecting element 22 generates a two-bit code depending on whether or not each photoelectric sensor 18, 19 faces an opening 13a of the third opening group 13.

The fifth photoelectric sensor 20 is located at a position corresponding to a path formed by the second opening group 12 when the rotary disk 5 rotates. The fifth photoelectric sensor 20 thus functions as a reference angle detecting element. As shown in FIG. 3, the fifth photoelectric sensor 20 is located on the line corresponding to the axis O and the first photoelectric sensor 16. The fifth photoelectric sensor 20 generates a binary code depending on whether or not the rotary disk 5 blocks the fifth light emitting element 20a from the fifth light receiving element 20b. In other words, the fifth photoelectric sensor 20, or the reference angle detecting element, generates a binary code "1" if any opening 12a is located between the fifth light emitting element 20a and the fifth light receiving element 20b. The fifth photoelectric sensor 20 otherwise generates a binary code "0".

As described, the reference angle detecting element, or the fifth photoelectric sensor 20, generates a binary code when facing any opening 12a of the second opening group 12. The relative angle detecting element 21, which includes the first and second photoelectric sensors 16, 17, generates a two-bit code when facing any opening 11a of the first opening group 11. The position data detecting element 22, which includes the third and fourth photoelectric sensors 18, 19, generates a two-bit code when facing any opening 13a of the third opening group 13. The relationship among the binary codes will hereafter be described.

When the rotary disk 5 is rotated at an angle of 22 degrees from a position corresponding to zero degrees, the fifth photoelectric sensor 20 detects that the rotary disk 5 is located at a reference angle position. If the rotary disk 5 is further rotated by an angle of 23 degrees from this position, the fifth photoelectric sensor 20 re-detects that the rotary disk 5 is located at a subsequent reference angle position.

More specifically, if the rotary disk 5 is rotated by angles of zero degrees, 22 degrees, 45 degrees, 67 degrees, or the like, as shown in FIG. 5, the rotary disk 5 is located at a reference angle position. The fifth photoelectric sensor thus generates a binary code "1". In the table of FIG. 5, data corresponding to the reference angles positions are underlined for convenience of understanding. For example, if the rotary disk 5 is located at a position corresponding to zero degrees, the fifth photoelectric sensor 20 generates a binary code "1". In this state, the first photoelectric sensor 16 generates a binary code "0", the second photoelectric sensor 17 generates a binary code "1", the third photoelectric sensor 18 generates a binary code "0", and the fourth photoelectric sensor 19 generates a binary code "0".

If the rotary disk 5 is located at a position corresponding to a different reference angle and the fifth photoelectric sensor 20 generates a binary code "1", the first to fourth photoelectric sensors 16 to 19 generate corresponding binary codes in a different combination. That is, the combination of the binary codes generated by the first to fourth photoelectric sensors 16 to 19 is changed depending on which reference angle position the rotary disk 5 is in. Each reference angle is thus accurately determined depending on the combination of the binary codes.

In other words, the openings 13a of the third opening group 13 are located relative to other openings such that the combination of the binary codes generated by the first to fourth photoelectric sensors 16 to 19 is changed depending on which reference angle the rotary disk 5 is rotated at.

As shown in FIG. 4, the relative angle detecting element 21, the position data detecting element 22, and the fifth photoelectric sensor 20, or the reference angle detecting element, each output a signal to the computing portion 3. The computing portion 3 includes a central processing unit (CPU) 3a, a read only memory (ROM) 3b, and a random access memory (RAM) 3c. The ROM 3b stores a program executed by the CPU 3a to compute the rotational angle of the rotary disk 5. The RAM 3c temporarily stores the value computed by the CPU 3a. The ROM 3b also stores angle data corresponding to a number of rotational angles. The angle data includes the binary codes generated by the first to fourth photoelectric sensors 16 to 19 when the fifth photoelectric sensor 20 faces any opening 12a of the second opening group 12.

The CPU 3a first computes the current reference angle and then obtains a relative angle with reference to the reference angle. In other words, when the rotary disk 5 is located at one of the reference angle positions, the fifth photoelectric sensor 20, or the reference angle detecting element, faces a corresponding opening 12a of the second opening 12. The CPU 3a then computes the reference angle in accordance with the binary codes generated by the first to fifth photoelectric sensors 16 to 20 with reference to the angle data stored in the ROM 3b. More specifically, the binary codes generated by the first to fourth photoelectric sensors 16 to 19 are treated as four-bit codes. In the four-bit code, the binary codes generated by the position data detecting element 22 correspond to upper places, and the binary codes generated by the relative angle detecting element 21 correspond to lower places. The four-bit code is converted to a decimal number, and the CPU 3a multiplies the decimal number by the binary code generated by the fifth photoelectric sensor 20, thus obtaining a decimal output, as shown in FIG. 5. The angle data stored by the ROM 3b includes an angle value corresponding to each possible decimal output. Thus, the CPU 3a determines the reference angle based on the decimal output and reference to the angle data of the ROM 3b. In this embodiment, the reference angle is zero degrees when the decimal output is "1". In other words, when the two-bit code generated by the relative angle detecting element 21 is "0·1" and the two-bit code generated by the position data detecting element 22 is "0·0" while the binary code generated by the fifth photoelectric sensor 20, or the reference angle detecting element, is "1", the CPU 3a determines that the reference angle is zero degrees. Likewise, when the fifth photoelectric sensor 20 faces any other opening 12a of the second opening group 12, the CPU 3a computes a corresponding reference angle in accordance with the binary codes generated by the first to fourth photoelectric sensors 16 to 20 with reference to the angle data stored by the ROM 3b. For example, if the binary codes generated by the first to fifth photoelectric sensors 16 to 20 are all "1", as shown in FIG. 3, the CPU 3a determines that the corresponding reference angle at which the rotary disk 5 is located is 67 degrees, as shown in FIG. 5.

Subsequently, when the rotary disk 5 is rotated from the position corresponding to the reference angle, the CPU 3a computes the corresponding rotational angle as a relative angle in accordance with the two-bit codes generated by the relative angle detecting element 21. More specifically, as shown in FIG. 5, when the rotary disk 5 is located at a position corresponding to the reference angle of zero degrees, the two-bit code generated by the relative angle detecting element 21 is "0·1". Thus, if the code generated by the relative angle detecting element 21 is changed to "0·0", the CPU 3a determines that the rotary disk 5 is rotated by one degree from the reference angle. That is, the CPU 3a determines that the relative angle, or the rotational angle of the rotary disk 5, is one degree.

When the operation of the rotational angle detecting apparatus 1 is initiated by, for example, supplying power to the rotational angle detecting apparatus 1, the reference angle of the rotary disk 5 is first determined. More specifically, the fifth photoelectric sensor 20, or the reference angle position detecting element, detects whether or not any opening 12a of the second opening group 12 is located between the fifth light emitting element 20a and the fifth light receiving element 20b. In this state, only the fifth photoelectric sensor 20 is activated, and the relative angle detecting element 21 and the position data detecting element 22 are both de-activated. Once the fifth photoelectric sensor 20 faces an opening 12a of the second opening group 12, the relative angle detecting element 21 and the position data detecting element 22 are activated, thus determining the corresponding reference angle. In other words, when initiating its operation, the rotational angle detecting apparatus 1 first initializes the rotational angle of the rotary disk 5. After completing the initializing step, the rotational angle detecting apparatus 1 activates only the relative angle detecting element 21. The relative angle detecting element 21 thus generates a two-bit code depending on whether or not the relative angle detecting element 21 faces any opening 11a of the first opening group 11. The CPU 3a of the rotational angle detecting apparatus 1 then computes the relative angle, or the rotational angle of the rotary disk 5 with respect to the reference angle determined in the initializing step, in accordance with the two-bit code generated by the relative angle detecting element 21.

In other words, once the rotational angle detecting apparatus 1 determines the reference angle of the rotary disk 5 in the initializing step, the rotational angle of the rotary disk 5 is computed with respect to the determined reference angle.

In the illustrated embodiment, it is detected that the rotary disk 5 is rotated to a reference angle determining position every 22 or 23 degrees of the rotational angle of the rotary disk 5. Thus, a maximum angle at which the steering shaft 7 must be rotated to detect the reference angle is 23 degrees. That is, the reference angle is determined without rotating the steering shaft 7 by a relatively large angle. This makes it easy for the rotational angle detecting apparatus 1 to determine the reference angle of the rotary disk 5 when initiating its operation, or to initialize the rotational angle of the rotary disk 5.

The fifth photoelectric sensor 20, or the reference angle detecting element, and the position data detecting element 22 are activated only when the reference angle of the rotary disk 5 is determined. That is, the fifth photoelectric sensor 20 and the position data detecting element 22 are de-activated when the relative angle detecting element 21 determines the relative angle of the rotary disk 5. This structure reduces the power consumption of the rotational angle detecting apparatus 1.

The circumferential dimension W3 of each opening 12a of the second opening group 12 is approximately a third of the circumferential interval W1 between the adjacent openings 11a of the first opening group 11. Thus, the fifth photoelectric sensor 20 detects that the fifth sensor 20 faces an opening 12a only when an opening 12a is located accurately between the fifth light emitting element 20a and the fifth light receiving element 20b. In other words, since the dimension W3 of the openings 12a is relatively small, the reference angle of the rotary disk 5 is determined accurately.

Among the first to third opening groups 11 to 13, the first opening group 11 is outermost on the rotary disk 5. Thus, the circumference of the circle along which the first opening group 11 is located is the largest among the first to third opening groups 11 to 13. This increases the number of the openings 11a of the first opening group 11, which are used for determining the relative angle, or the rotational angle, of the rotary disk 5. Accordingly, the resolution of the rotational angle detecting apparatus 1 is improved.

It should be apparent to those skilled in the art that the present invention may be embodied in many other specific forms without departing from the spirit or scope of the invention. Particularly, it should be understood that the invention may be embodied in the following forms.

Although the first opening group 11 is located radially outermost in the illustrated embodiment, the second opening group 12 or the third opening group 13 may be radially outermost. That is, the positions of the first to third opening groups 11 to 13 may be changed relative to one another, as desired.

The reference angle of the rotary disk 5 does not necessarily have to be detected every 22 or 23 degrees. For example, the reference angle of the rotary disk 5 may be detected every five or ten degrees. However, if the number of the reference angle detecting positions is increased, the number of the position data detecting elements 22 must be increased while the arrangement of the third openings 13a in the third opening group 13 must be modified correspondingly. For example, if the number of the reference angles is changed to 32, the position data detecting element 22 must include three photoelectric sensors.

The fifth photoelectric sensor 20, or the reference angle position detecting element, may be activated when the relative angle of the rotary disk 5 is determined. In this case, if the fifth photoelectric sensor 20 faces an opening 12a of the second opening group 12, the corresponding reference angle is computed. The resulting reference angle is then compared with the determined relative angle. If the reference angle does not correspond to the relative angle, the relative angle is corrected to a value corresponding to the reference angle. In this manner, even if a detection error is caused during the determination of the relative angle of the rotary disk 5, the error is automatically corrected.

The number of the openings 11a of the first opening group 11 may be changed to obtain a desired resolution of the rotational angle detecting apparatus 1.

Therefore, the present examples and embodiments are to be considered as illustrative and not restrictive and the invention is not to be limited to the details given herein, but may be modified within the scope and equivalence of the appended claims.

What is claimed is:

1. A rotational angle detecting apparatus, wherein, a relative rotational angle of a rotary body is measured with respect to a reference angle, the apparatus comprising:

a disk, which is coaxial with the rotary body, wherein the disk rotates integrally with the rotary body;

a first group of openings, wherein the first group of openings includes a plurality of openings arranged about the entire circumference of the disk and spaced from one another by a predetermined pitch, wherein the openings of the first group are used for detecting the relative rotational angle;

a first detecting element, which detects openings of the first group and generates a first binary code;

a computing means for computing the relative rotational angle of the rotary body in accordance with the first binary code;

a second group of openings, wherein the second group of openings includes a plurality of openings arranged concentrically with the first group, wherein the openings of the second group are used for detecting a plurality of reference angle positions that are located at predetermined positions;

a second detecting element, which detects openings of the second group and generates a second binary code;

a third group openings, wherein the third group includes a plurality of openings arranged concentrically with the first and second groups, wherein the openings of the third opening group are located relative to one another in accordance with a predetermined arrangement;

a third detecting element, which detects openings of the third group and generates a third binary code;

a memory, which stores a combination of the first binary code and the third binary code in correspondence with angle data, wherein the combination varies depending on the position of the rotary body; and a determining means for determining the reference angle in accordance with the associated combination of the first and third binary codes that are stored by the memory.

2. The apparatus as set forth in claim 1, wherein the relative angle computed by the computing means is initialized every time the second detecting element determines the reference angle.

3. The apparatus as set forth in claim 1, wherein the circumferential dimension of each opening of the first opening group is equal to the circumferential distance between adjacent openings of the first group.

4. The apparatus as set forth in claim 3, wherein the first detecting element includes first and second photoelectric sensors, and the phase of a signal generated by the second photoelectric sensor is offset from the phase of a signal generated by the first photoelectric sensor by one quarter cycle.

5. The apparatus as set forth in claim 1, wherein the first opening group includes ninety openings that are arranged in a circumferential direction.

6. The apparatus as set forth in claim 1, wherein the first opening group is located outward of the second and third groups.

7. The apparatus as set forth in claim 1, wherein said determining means determines the reference angle of the rotary body based on the first binary code and the third binary code respectively generated by the first detecting element and the third detecting element and the predetermined data relating to the combination of the first binary code and the third binary code.

8. The apparatus as set forth in claim 1, wherein the second detecting element and the third element are actuated only when the reference angle of the rotary body is determined.

9. The apparatus as set forth in claim 1, wherein the second detecting element is actuated to detect the second group of the openings when the apparatus is initially actuated, wherein the first detecting element and the third detecting element are actuated to respectively generate the first binary code and the third binary code, wherein the first detecting element is solely actuated after the reference angle has been determined based on the first binary code and the third binary code so as to compute the rotational angle of the rotary body based on the first binary code.

10. A rotational angle detecting apparatus, a relative rotational angle of a rotary body is measured with respect to a reference angle, the apparatus comprising:

a disk, which is coaxial with the rotary body, wherein the disk rotates integrally with the rotary body;

a first group of openings, wherein the first group of openings includes a plurality of openings arranged about the entire circumference of the disk and spaced from one another by a predetermined pitch, wherein the openings of the first group are used for detecting the relative rotational angle;

a first detecting element, which detects openings of the first group and generates a first binary code;

a computing means for computing the relative rotational angle of the rotary body in accordance with the first binary code;

a second group of openings, wherein the second group of openings includes a plurality of openings arranged concentrically with the first group, wherein the openings of the second group are used for detecting a plurality of reference angle positions that are located at predetermined positions;

a second detecting element, which detects openings of the second group and generates a second binary code;

an initializing means for initializing the relative angle computed by the computing means every time the second detecting element detects a reference angle position of the disk;

a third group of openings, wherein the third group includes a plurality of openings arranged concentrically with the first and second groups, wherein the openings of the third opening group are located relative to one another in accordance with a predetermined arrangement;

a third detecting element, which detects openings of the third group and generates a third binary code;

a memory, which stores a combination of the first binary code and the third binary code in correspondence with angle data, wherein the combination varies depending on the position of the rotary body; and a determining means for determining the reference angle in accordance with the associated combination of the first and third binary codes that are stored by the memory.

11. The apparatus as set forth in claim 10, wherein the circumferential dimension of each opening of the first opening group is equal to the circumferential distance between adjacent openings of the first group.

12. The apparatus as set forth in claim 11, wherein the first detecting element includes first and second photoelectric sensors, and the phase of a signal generated by the second photoelectric sensor is offset from the phase of a signal generated by the first photoelectric sensor by one quarter cycle.

13. The apparatus as set forth in claim 10, wherein the first group includes ninety openings that are arranged in a circumferential direction.

14. The apparatus as set forth in claim 10, wherein the first opening group is located outward of the second and third opening groups.

15. The apparatus as set forth in claim 10, wherein the circumferential dimension of each opening of the second opening group is substantially one third of the circumferential dimension of each opening of the first group.

16. The apparatus as set forth in claim 10, wherein said determining means determines the reference angle of the rotary body based on the first binary code and the third binary code respectively generated by the first detecting element and the third detecting element and the predetermined data relating to the combination of the first binary code and the third binary code.

17. The apparatus as set forth in claim 10, wherein the second detecting element and the third element are actuated only when the reference angle of the rotary body is determined.

18. The apparatus as set forth in claim 10, wherein the second detecting element is actuated to detect the second group of the openings when the apparatus is initially actuated, wherein the first detecting element and the third detecting element are actuated to respectively generate the first binary code and the third binary code, wherein the first detecting element is solely actuated after the reference angle has been determined based on the first binary code and the third binary code so as to compute the rotational angle of the rotary body based on the first binary code.

* * * * *